US005691617A

United States Patent [19]
Funches

[11] Patent Number: 5,691,617
[45] Date of Patent: Nov. 25, 1997

[54] DISC DRIVE TRANSDUCER DEADBEAT SETTLE METHOD UTILIZING INTERVAL CORRECTION

[75] Inventor: Otis L. Funches, Oklahoma City, Okla.

[73] Assignee: Seagate Technology, Inc., Scotts Valley, Calif.

[21] Appl. No.: 117,190

[22] PCT Filed: Jul. 12, 1993

[86] PCT No.: PCT/US93/06526

§ 371 Date: Jan. 11, 1996

§ 102(e) Date: Jan. 11, 1996

[87] PCT Pub. No.: WO95/02882

PCT Pub. Date: Jan. 26, 1995

[51] Int. Cl.$^6$ .................................................. H02P 3/00
[52] U.S. Cl. ........................ 318/632; 318/273; 369/235
[58] Field of Search ........................ 318/611, 632, 318/651, 652, 362–382, 273–275; 360/73.01, 73.03–77.02; 369/13, 15; 364/44.32, 44.35, 232, 234, 235, 236, 237, 239

[56] References Cited

U.S. PATENT DOCUMENTS

| | | | |
|---|---|---|---|
| 4,168,457 | 9/1979 | Rose | 318/561 |
| 4,535,372 | 8/1985 | Yeakley | 360/77 |
| 4,551,776 | 11/1985 | Roalson | 360/77 |
| 4,724,369 | 2/1988 | Hashimoto | 318/561 |
| 4,775,903 | 10/1988 | Knowles | 360/78 |
| 4,791,548 | 12/1988 | Yoshikawa et al. | 364/149 |
| 4,816,941 | 3/1989 | Edel et al. | 360/78.12 |
| 4,894,599 | 1/1990 | Ottesen et al. | 318/636 |
| 4,940,924 | 7/1990 | Mizuno et al. | 318/560 |
| 5,126,897 | 6/1992 | Ogawa et al. | 360/78.09 |
| 5,136,561 | 8/1992 | Goker | 369/32 |
| 5,206,570 | 4/1993 | Hargarten et al. | 318/611 |
| 5,402,400 | 3/1995 | Hamada et al. | 360/75 |
| 5,469,414 | 11/1995 | Okamura | 360/75 |

*Primary Examiner*—Jonathan Wysocki
*Attorney, Agent, or Firm*—Bill D. McCarthy; Edward P. Heller, III; Randall K. McCarthy

[57] ABSTRACT

A method for settling a transducer (18) of a hard disc drive (10) on a target track (30) on a rotating disc (12) of the disc drive at the end of a seek to the target track in a determined time period. The time period is divided into two deadbeat intervals(58, 60), each of which is divided into a plurality of time intervals in each of which the location of the transducer with respect to the target track is measured (80) and an accepted value of transducer velocity is measured (82) or determined from successive locations of the transducer. In the first time interval of the each deadbeat interval, a deadbeat value of a control signal is determined (88) on the basis of ideal deadbeat settle of the transducer to the target track and outputted to a power amplifier (36) that drives the actuator (40) on which the transducer is mounted for radial movement of the transducer across the disc. In subsequent intervals of each deadbeat interval, an interval correction (102), determined in relation to the difference between a projected velocity determined from the deadbeat value of the control signal and the accepted velocity of the transducer, is added to the deadbeat value and outputted (94) to the power amplifier. A second interval correction 132, 136, 138 can be added to the deadbeat value to correct for a long power amplifier time constant.

3 Claims, 5 Drawing Sheets

DISC DRIVE TRANSDUCER DEADBEAT SETTLE METHOD UTILIZING INTERVAL CORRECTION

TECHNICAL FIELD

The present invention relates generally to improvements in disc drive servo methods, and, more particularly, but not by way of limitation, to improvements in methods for settling a disc drive transducer on a target track defined on a rotating disc of a disc drive at the end of a seek to the target track.

BACKGROUND ART

In a disc drive for storing computer files, the files are stored in magnetizable surface coatings on rotating discs by magnetizing the coatings in a pattern that reflects bits of data of which the file is comprised. To this end, a disc drive is comprised of a plurality of read/write transducers, supported in close proximity to the disc surfaces by an electromechanical actuator, that receive electrical currents reflective of the data bits to produce magnetic fields that magnetize the surface coatings in either of two directions as the coatings pass the transducer. Subsequently, files can be read by using the transducers to detect magnetic fields produced adjacent the disc surfaces by the magnetization of the coatings.

In order to record or retrieve a file, concentric data tracks are defined on the disc surfaces and records are maintained in a file allocation table to identify the surface, or surfaces, that contain a particular file and the data tracks on those surfaces at which the file is located. During writing and reading of a file, the transducer that is to read or write data is maintained in radial alignment with a selected track by a servo system that is operated in a track following mode by reading servo patterns magnetically prerecorded on one or more of the disc surfaces and continually maintains the alignment between the transducer and the selected track. The servo system is also operable in a seek mode for moving the transducers from a track currently being followed to a target track that contains, or is to receive, a new file.

The widespread use of disc drives to store computer files stems from two basic disc drive characteristics arising from the above recited construction and manner of operation: large data storage capacity and short file access times. Positioning of the transducers by a servo system permits the data tracks to be closely spaced with the result that a disc drive can store a tremendous amount of user data in a small volume. Average random access time is a weighted time average based upon the time to seek from one track to another for all possible seek lengths. The probability of shorter seek lengths is higher than the large seek lengths. Further, a one track seek has the highest probability and therefore the time for a one track seek has the heaviest weight. Settle time is a larger percentage of seek time for the shorter seek lengths and in general, the shorter the seek length the higher the percentage of the settle time relative to total seek time. Therefore, a significant reduction in settle time can result in a significant reduction in seek time for the shorter seek lengths which in turn would reduce average random access time. It is the reduction in random average access time that the present invention addresses.

Seeks from one track to another are usually realized under some form of velocity control, during which the transducers follow a velocity trajectory determined by a velocity profile table contained in the servo microprocessor memory. The velocity profile varies the velocity trajectory as a function of the distance to the target track. During the seek, the location and velocity of the transducers are repetitively sampled and the transducers are accelerated in relation to the difference between the actual transducer velocity and the profile velocity for the present distance remaining in the seek. The velocity profile is selected to cause the transducers to undergo a rapid acceleration at the initiation of the seek and to decelerate to the target track at the end of the seek by requiring the profile velocity to be large for large distances from the target track and to decrease to zero as the distance to the target track approaches zero.

While this general approach has worked well, it suffers from limitations that give rise to problems in the settling of the transducers on the target track at the end of a seek. The velocity profile is stored as a set of discrete values in a look-up table and the number of values that may be stored is limited by the amount of memory that can be allocated to velocity control during a seek. As a result, the profile velocities are only approximately defined. Moreover, the difference in velocity steps of the profile and the time between steps increases as the speed of the transducers becomes small at the end of a seek. Further, the acceleration of the transducers is limited by the amount of power that can be supplied by a power amplifier that drives the actuator to accelerate the transducers so that the transducers will only approximately follow the velocity profile. The net result is that the transducers reach the vicinity of the target track with a range of velocities that can complicate the problem of settling the transducers on the target track; that is, bringing the transducers to rest on the target track, so that writing or reading may be commenced. Consequently, settling times, usually effected under position control of the transducers, can be undesirably extended to increase the time required to access a track on which a file is to be read or written.

In order to minimize the time required for the transducer to settle on a target track, it has been proposed to use a deadbeat settle approach in which the transducers are accelerated or decelerated in a succession of deadbeat intervals in response to control signals that are determined by the initial conditions with which the transducers enter a settle control region defined about each track and by the requirement that the settle end with the transducer on track with zero velocity. However, disc drive power amplifier limitations require that the deadbeat intervals be made relatively long to insure that the acceleration or deceleration of the transducers required in a deadbeat settle can be achieved. As a consequence, deadbeat settle for a disc drive requires that the servo control loop be open for long periods of time.

Long open loop periods reduce the ability of a disc drive to reduce disturbances. In particular, the forces acting on the actuator during the settle period can have an appreciable effect on the performance of a deadbeat controller when the deadbeat period is relatively long. As is known in the art, the actuator is subject to a number of disturbing forces; for example, windage forces exerted on the actuator by air swirled by the discs, and these forces, if not compensated, can have an appreciable effect over a long deadbeat settle interval that will prevent the deadbeat settle scheme from accomplishing its goal of bringing the transducer to rest at the target track. Thus, prior to the present invention, the problem of minimizing the time for settling the transducers on a target track at the end of a seek in the presence of external disturbances has not been effectively solved.

DISCLOSURE OF THE INVENTION

The present invention provides a settle method which retains the advantages of deadbeat settle while compensating for the disturbances that could cause a pure deadbeat approach to deviate greatly from the ideal response. To this end, the settle method of the present invention contemplates that settling of the transducers will be effected, as in the pure deadbeat approach, in a plurality of deadbeat intervals which are each comprised of a plurality of time intervals in which compensation is effected for disturbances the actuator may experience during the settling of the transducers. More particularly, in the first time interval of each deadbeat interval, control signals outputted from the servo microprocessor to the power amplifier that drives the actuator are determined on the basis of deadbeat settle; that is, in accordance with a control equation that satisfies deadbeat settle conditions. Subsequently, in each remaining time interval of each deadbeat interval, a projected velocity; specifically, the velocity the transducers would attain at the beginning of the time interval under deadbeat settle conditions, is calculated and compared to an accepted value of the transducer velocity that can be determined in any convenient way. For example, should the disc drive comprise a velocity transducer, the output of such transducer, inputted at the beginning of the time interval can be used as the accepted velocity. However, as will be discussed more fully below, the invention is not limited to disc drives including actuator velocity transducers. The control signal outputted to the power amplifier is then adjusted from the value determined for deadbeat settle in the first time interval of the deadbeat interval by adding an interval correction that is proportional to the difference between the projected and accepted values of the transducer velocity. Consequently, the transducer is caused to substantially follow a deadbeat trajectory to reach substantially the final state that would be achieved in an ideal deadbeat settle; that is, on track with zero velocity, at the end of the final deadbeat interval.

An important object of the present invention is to reduce access time of tracks along which data is stored in a disc drive.

Another object of the invention is to minimize track access time by minimizing the time required for settling a transducer on a disc drive data track at the end of a seek to the data track.

Still a further object of the invention is to provide an effective method for achieving the advantages of deadbeat settle in a disc drive while compensating for disturbances that would interfere with settle in a deadbeat approach.

Other objects, features and advantages of the present invention will become apparent from the following detailed description when read in conjunction with the drawings and appended claims.

DESCRIPTION OF THE DISC DRIVE

Figure 1:
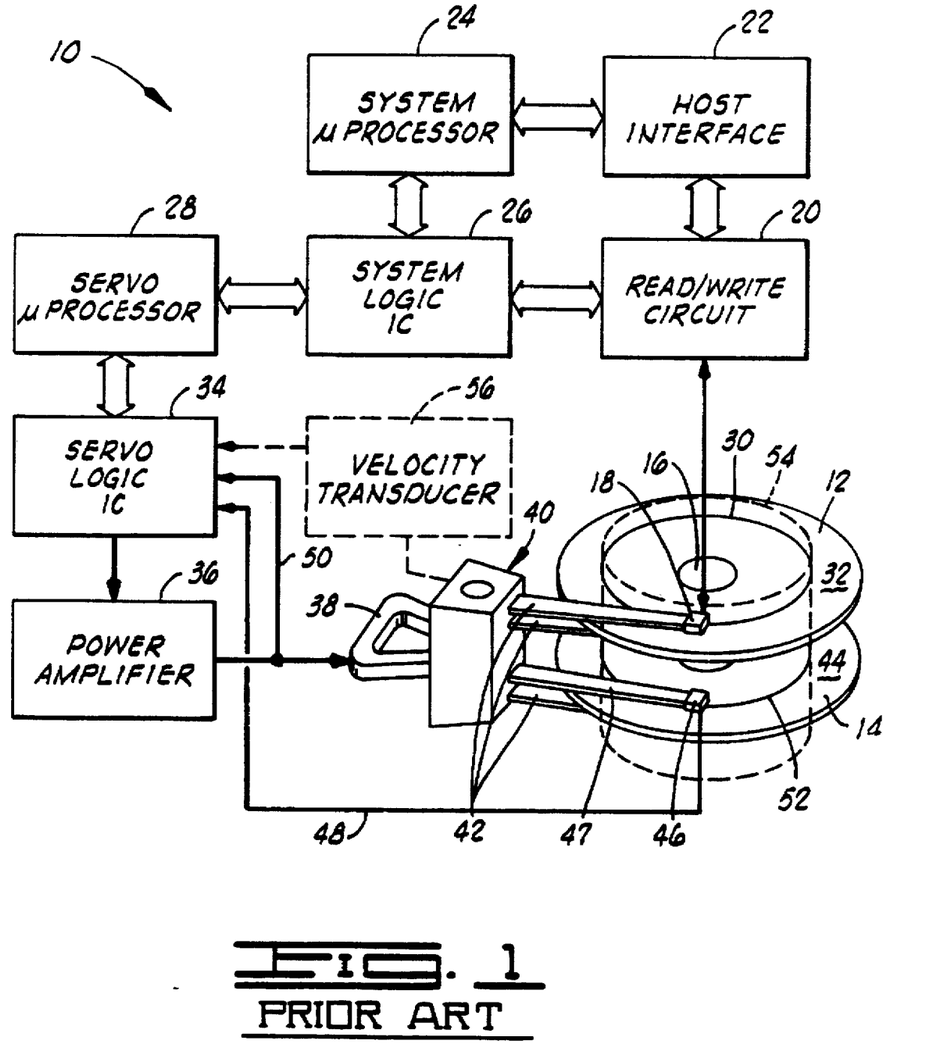
FIG. 1 is a block diagram of a typical disc drive in which the method of the present invention is practiced.

Referring to FIG. 1, shown therein and designated by the general reference numeral 10 is a block diagram of a disc drive in which the method of the present invention might be practiced. More particularly, FIG. 1 illustrates features, typically found in disc drives, that are used in carrying out the inventive method in a manner to be described below. As is known in the art, such features vary from one disc drive to another so that FIG. 1 is not intended to illustrate a specific disc drive. Rather, it is intended to generally present disc drive features in order to provide a basis for describing the manner in which the features of any disc drive may be utilized in the practice of the method of the present invention.

In general, the disc drive 10 is comprised of a plurality of discs 12, 14 that are mounted on a spindle 16 for rotation of the discs about the axis of the spindle 16. As is conventional in the art, the discs 12, 14 have magnetizable surface coatings to permit data received from a host computer (not shown) to be written to the discs in the form of magnetized cells by read/write transducers, such as the transducer 18 in FIG. 1, that "fly" over the disc surfaces in close proximity thereto. To this end, the disc drive 10 is comprised of a read/write circuit 20 that receives a file to be stored from a host interface 22 and transfers the file, after encoding, to the read/write transducer 18 that is to write the data to a disc 12. Subsequently, the file can be read by the transducer 18, decoded by the read/write circuit 22 and returned to the host interface 22. Control and coordination of the operation of the disc drive 10 is effected by commands issued by a system microprocessor 24 to the host interface 22 and, via a system logic circuit 26, to the read/write circuit 20.

Similarly, the system microprocessor 24 issues commands to a servo microprocessor 28 that controls the location of the transducer 18 so that a file can be written to, or retrieved from, any location on any disc surface. More particularly, the disc surfaces are organized into concentric data tracks, such as the data track 30 on the upper surface 32 of disc 12, and the servo microprocessor 28 is programmed to receive commands from the system microprocessor 24, via the system logic IC, and generate commands and a control signal that will effect seeks of the read/write transducer 18 from one data track to another and control the position of the transducer 18 to maintain data track following once a seek has been completed. Typically, the commands and the control signal are provided to a servo logic IC 34 and the control signal, transmitted to a power transconductance amplifier 36, results in the passage of a current through a coil 38 of an actuator 40 on which the read/write transducers, such as the transducer 18, are mounted via arms 42 that extend into the stack of discs 12, 14 mounted on the spindle 16. The coil 38 is immersed in a magnetic field so that the control signal is translated, first, into a current through the coil 38 and, consequently, into a force that can be used to accelerate the read/write transducers 18 in either radial direction across the disc surfaces.

To enable the servo microprocessor to generate the control signal required to effect a specific movement of the read/write transducers 18, for track seeking or following, it is common practice to write servo patterns to one or more disc surfaces and read the patterns to generate transducer position location information that is transmitted to the servo microprocessor 28. A common practice with respect to the generation of the position information, illustrated in FIG. 1, is to dedicate one surface 44 of one disc, the disc 14 in FIG. 1, to servo control of the actuator 40 and write the servo patterns to the dedicated servo surface at the time the disc drive 10 is manufactured. These patterns are then read by a servo transducer 46, supported in close proximity to the dedicated servo surface 44 by the actuator 40 and a support arm 47, to generate signals indicative of the servo transducer location for transmission to the servo microprocessor 28 as indicated by the signal path 48 in FIG. 1. A suitable format for the servo patterns written to a dedicated servo surface of a disc of a disc drive has been illustrated in U.S. Pat. No. 5,262,907, entitled "Hard Disc Drive with Improved Servo System" issued Nov. 16, 1993 Duffy et al. Moreover, and as also taught in U.S. Pat. No. 5,262,907, the output of the power amplifier 36; that is, the current through the actuator coil 38, may be transmitted to the servo microprocessor 28, as symbolically indicated by the signal path 50 in FIG. 1, to provide further information with respect to the mechanical state of the servo transducer 46.

As the above indicates, control of the position and of movement of the read/write transducers 18 in a disc drive having a dedicated servo surface 44 is effected by controlling the position and movement of the servo transducer 46. To this end, servo tracks, one of which has been indicated at 52, are defined by the servo patterns on the dedicated servo surface and the data and servo tracks are organized into cylinders which each contain a servo track and a plurality of data tracks, one on each data surface. (The cylinder containing the data track 30 and servo track 52 has been indicated at 54 in FIG. 1.) A more complete description of a disc drive servo system having the described features can be found in the aforementioned U.S. Pat. No. 5,262,907, the teachings of which are hereby incorporated by reference.

A useful feature that has also been described in U.S. Pat. No. 5,262,907 is a capability for adjusting the position information received from the servo transducer 46 to compensate for mechanical offsets between the servo transducer 46 and each read/write transducer 18. As taught by such patent application, predetermined values of the offsets can be subtracted from the servo transducer position information in the servo logic IC 34, by outputting the offset to a difference amplifier (not shown) that converts signals received from the servo transducer to a position error signal that is transmitted to the servo microprocessor 28. As will be clear to those of skill in the art, it is the position of the read/write transducers 18, instead of the servo transducer 46, that is to be controlled during track following and during settle of the transducers on a selected track. The use of this feature will be discussed below. However, it will be recognized that such feature is not a necessity for the practice of the present invention; the position of each read/write transducer 18 can be calculated from the position of the servo transducer 46 once the offsets have been measured. A particularly useful method for determining and using the offsets has been described in U.S. patent application Ser. No. 08/060,858 entitled "Improved Data Track Following Method for Disc Drives" filed May 12, 1993 by Hampshire et al.

A final feature of disc drives which, if present in a disc drive, finds use in the present invention is a velocity transducer 56, indicated in dashed line in FIG. 1, that is mechanically linked to the actuator 40 and provides a signal indicative of the rate of rotation of the actuator 40 to the servo logic IC 34.

IDEAL DEADBEAT SETTLE

Figure 2:
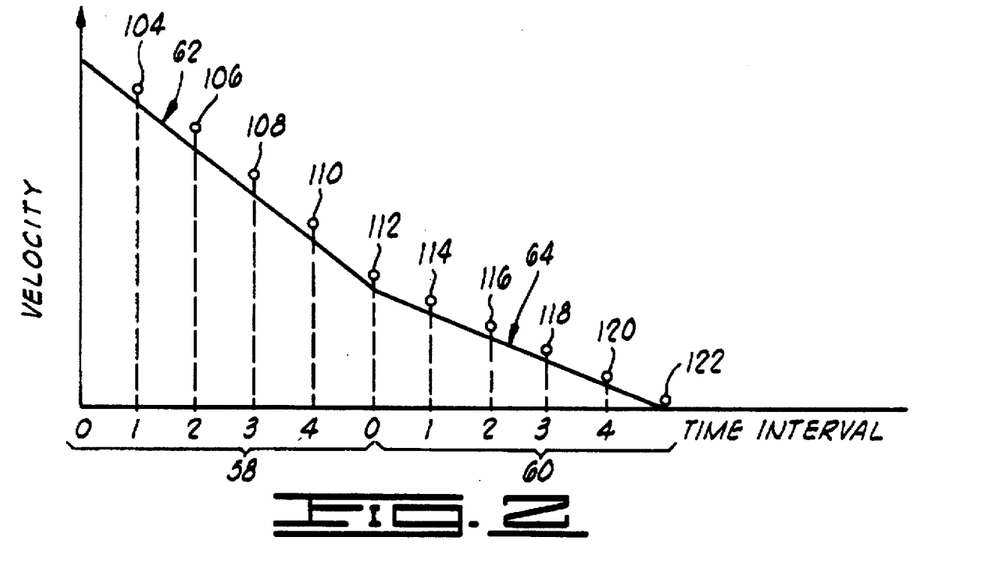
FIG. 2 is a comparison of the transducer velocity versus time for ideal deadbeat settle of the transducer and settle in accordance with the present invention.
Figure 3:
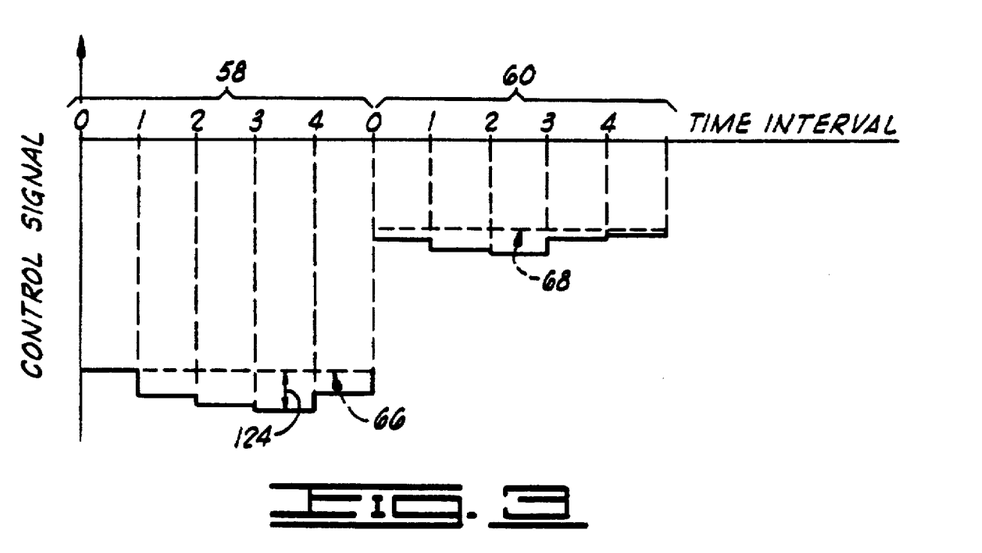
FIG. 3 is a comparison of the control signal versus time for ideal deadbeat settle and settle in accordance with the present invention.

As has been noted above, the method of the present invention utilizes control signals that are determined, in part, in accordance with an ideal deadbeat approach to settling of the transducer 18 on data tracks at the end of a seek. Accordingly, it will be useful to briefly review the deadbeat settle strategy to provide a basis for description of the settle method of the present invention. FIGS. 2 and 3, which present the velocity and acceleration of the transducer 18 during an ideal second order deadbeat settle have been presented for this purpose and, further, for the purpose of more fully bringing out the inventive method to be discussed below. While a second order deadbeat settle has been illustrated in FIGS. 2 and 3, it will be recognized by those of skill in the art that the present invention is not limited to the determination of control signals with respect to a second order deadbeat settle. Rather, second order deadbeat settle has been presented in FIGS. 2 and 3 in the spirit of providing a concrete example that will facilitate an understanding of the present invention.

The deadbeat settle strategy contemplates that a control object, for example, a read/write transducer of a disc drive, will be brought to rest at a specific location in a plurality of deadbeat intervals equal in number to the order of the particular deadbeat control realization that is employed. Thus, in a second order deadbeat realization, the control object is brought to rest in two deadbeat intervals that have been indicated at 58 and 60 respectively in FIGS. 2 and 3. In each deadbeat interval, the control object is uniformly accelerated or decelerated so that a graph of the velocity of the control object as a function of time would have the form of two straight lines as indicated by the lines 62 and 64 in FIG. 2. Similarly, in each deadbeat interval, the acceleration is proportional to a control signal so that, during an ideal second order deadbeat settle of a control object, the control signal would have two successive constant values as indicated by the dashed lines 66 and 68 in FIG. 3.

In the case in which the control signal is outputted to a transconductance amplifier, as in the present invention, to generate a current that is passed through a coil immersed in a magnetic field, the relationship between the control signal and the acceleration can be expressed by the equations:

$$A(N) = Km\ I(N) \tag{1}$$

and $$I(N) = Ki\ U(N) \tag{2}$$

where $A(N)$ is the acceleration of the control object in the Nth deadbeat interval, $I(N)$ is the current through the coil in the Nth deadbeat interval, $U(N)$ is the value of the control signal in the Nth interval, $Km$ is a constant determined by the mechanical characteristics of the system being controlled; for example, a disc drive actuator, and $Ki$ is the transconductance of the amplifier.

Deadbeat settle is then, ideally, realized by relating the control signal in each deadbeat interval to the state of the control object at the start of the interval; that is, to the location and velocity of the control object at the start of the interval. In the case of a second order deadbeat realization, this relationship can be expressed as $$U(N) = -Kp\ X(N) - Kv\ V(N), \tag{3}$$

where $X(N)$ and $V(N)$ define the state of the system at the start of the Nth deadbeat interval and $Kp$ and $Kv$ are control constants determined by the requirement that the state of the system at the end of the Nth interval be zero; that is, that the control object come to rest with zero position error at the location from which the position $X$ of the control object is measured. In the case that has been illustrated in FIGS. 2 and 3, Kp and Kv can be determined from the equations $$2-K_v\ K_i\ K_m\ T_d - K_p\ K_i\ K_m\ T_d^2/2 = 0 \quad (4)$$

and $$1-K_v\ K_i\ K_m\ T_d + K_p\ K_i\ K_m\ T_d^2/2 = 0 \quad (5)$$

where Td is the duration bf the deadbeat interval. Additional deadbeat constants are similarly derived for higher order deadbeat strategies.

The present invention contemplates the use of deadbeat constants Kp(DB) and Kv(DB), in a manner that will be discussed below, that are determined on the basis of the ideal deadbeat strategy outlined above and, in such case, the constants Kp(DB) and Kv(DB) would have the values Kp and Kv determined in accordance with equations (4) and (5). Similarly, should it be desired to adapt a higher order deadbeat settle strategy to the purposes of the present invention, additional deadbeat constants would be selected to be deadbeat constants determined in the conventional manner. While, in the presently preferred practice of the present invention, only the constants Kp(DB) and Kp(DB) are utilized, the inventive method is not so limited. Rather, it is contemplated that additional deadbeat constants can be determined and utilized in the practice of the invention.

While, in principle, a deadbeat strategy as described above can be utilized to settle a read/write transducer on a selected data track, practical problems make a pure deadbeat scheme undesirable. For example, the power amplifiers of disc drives commonly have limited power handling capabilities to meet a disc drive power budget imposed by the environment; i.e., a computer, in which disc drives are used. Consequently, the acceleration of the transducers is limited so that the deadbeat intervals must be extended to avoid excessive control effort that would be required for shorter intervals that might be utilized in high order deadbeat realizations. However, the servo loop is open during each deadbeat interval so that forces, other than the force exerted by passage of a current through the actuator coil to accelerate the actuator, can give rise to large errors in the final mechanical state of the transducer. Such errors require time to correct and, accordingly, increase the access time for a move to a selected track. While the disturbances might be modeled and compensated in a deadbeat settle without using a lengthy deadbeat interval, such an approach can create demands on the servo microprocessor that are beyond its capabilities. Thus, a pure deadbeat approach to disc drive transducer settle, while feasible, is unattractive. The present invention provides an alternative settle method that provides all of the advantages of a pure deadbeat strategy while avoiding the major problems of the strategy. Such method, in two embodiments, will be discussed with respect to FIGS. 5 and 6.

MODES FOR CARRYING OUT THE INVENTION

Figure 4:
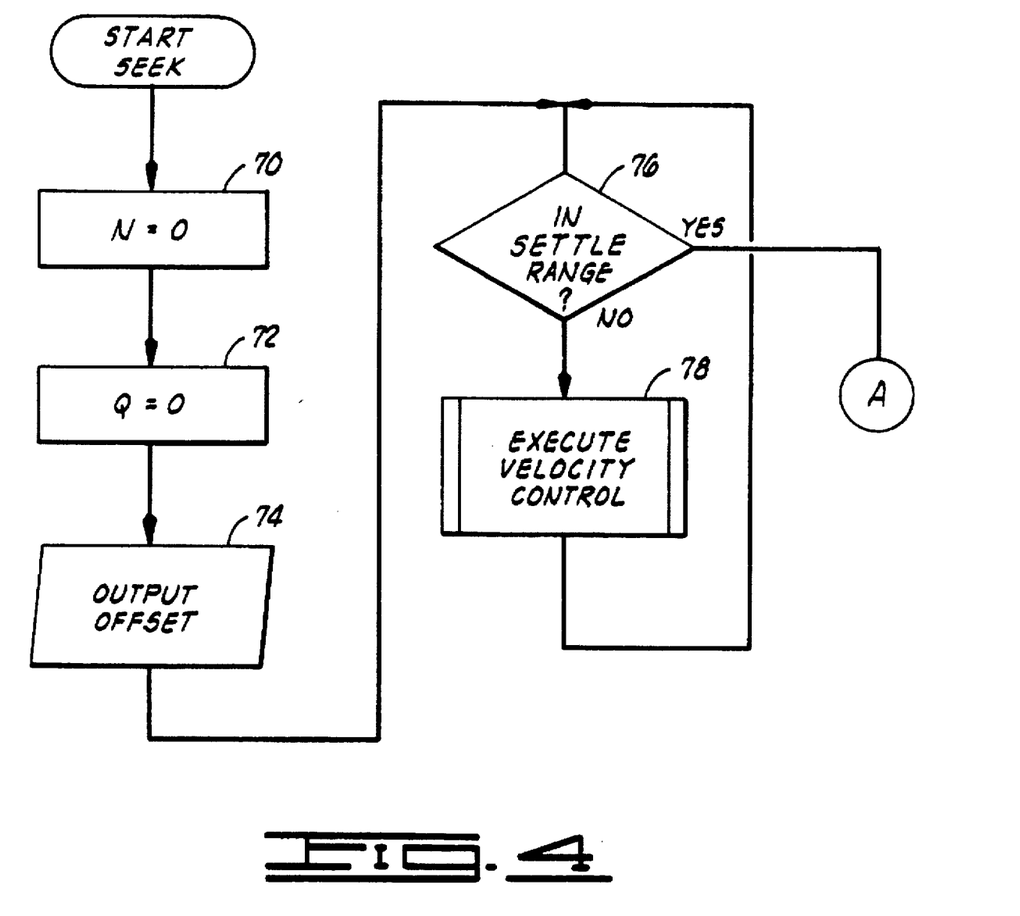
FIG. 4 is a flow chart of the servo system microprocessor seek program for moving transducers of the disc drive to a target track at which a file is to be stored or from which a file is to be retrieved.

Referring initially to FIG. 4, shown therein is a flow chart for a seek that has been adapted to terminate in the settle method of the present invention. To this end, the servo microprocessor 28 will respond to a command from the system microprocessor 24 to access a particular data track for storage or retrieval of a file by a selected read/write transducer 18 by initializing a deadbeat interval index N to zero at a step 70. Such index identifies each of a plurality of deadbeat intervals that, in the practice of the present invention, have durations selected on the basis of power amplifier 36 capabilities to include a plurality of time intervals during which the mechanical state of the transducer 18 which is to be moved to the data track can be determined during settle of the transducer 18 on the data track. Thus, for example, in the disc drive servo system described in the aforementioned U.S. Pat. No. 5,262,907, servo operations are carried out during interrupts of the servo microprocessor 28 that occur at equal time intervals and each deadbeat interval would be selected to be a fixed number of time intervals between successive interrupts. Alternatively, the time intervals which make up each deadbeat interval can be a servo routine loop time in which servo control is repetitively asserted by measuring parameters associated with the present state of the disc drive servo system and calculating a value of a control signal that is outputted to the power amplifier 36 to change such state in a desired way. The grouping of a plurality of time intervals to form a deadbeat interval has been indicated by the numbered time divisions in the graphs of FIGS. 2 and 3.

Following initialization of the deadbeat index N, a time interval index Q is initialized to zero at step 72. Such index identifies each time interval of each of the deadbeat intervals during which the settle of the transducer 18 on a target track is to be effected.

As noted above, the servo system that has been described in the aforementioned U.S. Pat. No. 5,262,907 has a capability of providing an offset to the servo logic IC 34 to compensate for misalignment between the servo and read/write transducers and, in such case, the offset appropriate to the read/write transducer that is to be settled on a data track for reading or writing a file is outputted at a step 74 shown in FIG. 4. The servo microprocessor 28 then enters a loop indicated by the decision block 76 and operations block 78 in FIG. 4. After checking to determine whether the transducer 18 has reached a location, measured from the target track, at which settle is to commence, step 76, the servo microprocessor will execute a conventional velocity control, or seek, routine, block 78, that will result, for a number of executions of the routine, in the acceleration of the transducer 46 and, consequently, the transducer 18 away from the track currently being followed and, subsequently, in the deceleration of the transducers toward the target track to which a file is to be written or from which a file is to be read. The manner in which a seek is carried out using velocity control of the movement of the transducers has been described in the aforementioned U.S. Pat. No. 5,262,907 and need not be further considered herein. As the seek proceeds, the transducer 18 will eventually be brought to a location from which a settle of the transducer 18 on the target track can be commenced and, at such time, the servo microprocessor 28 will exit from the seek routine loop to the settle routine that is presented, for the embodiment of the invention under consideration, in FIG. 5 as indicated by the connector labelled A in FIGS. 4 and 5. Suitably, the exit to the settle method can be selected to occur when the transducer 18 reaches a distance of one track spacing from the target track or enters a fine control region defined about each of the data tracks, often of width of one half of the spacing between successive data tracks.

Before turning the settle method of the present invention, it will be useful to note a feature of the seek routine that has been illustrated in FIG. 4. As is known in the art, seeks are most often made between successive cylinders of data and servo tracks. It is contemplated that, for one track seeks, the settle method of the present invention will be carried out without the execution of velocity control routines that would be executed for lengthy seeks. Such immediate entry of the servo microprocessor 28 into the settle mode, effected by selecting a settle range of one track spacing and preceding the velocity control block 78 of FIG. 4 by the decision block 76 in FIG. 4, is particularly well suited for a disc drive servo system having the features that have been described in the aforementioned U.S. Pat. No. 5,262,907. As described therein, each data track is addressed so that the location of the transducer 18 with respect to the target track can be determined for any location of the transducer 18 on the disc surface 32.

Figure 5:
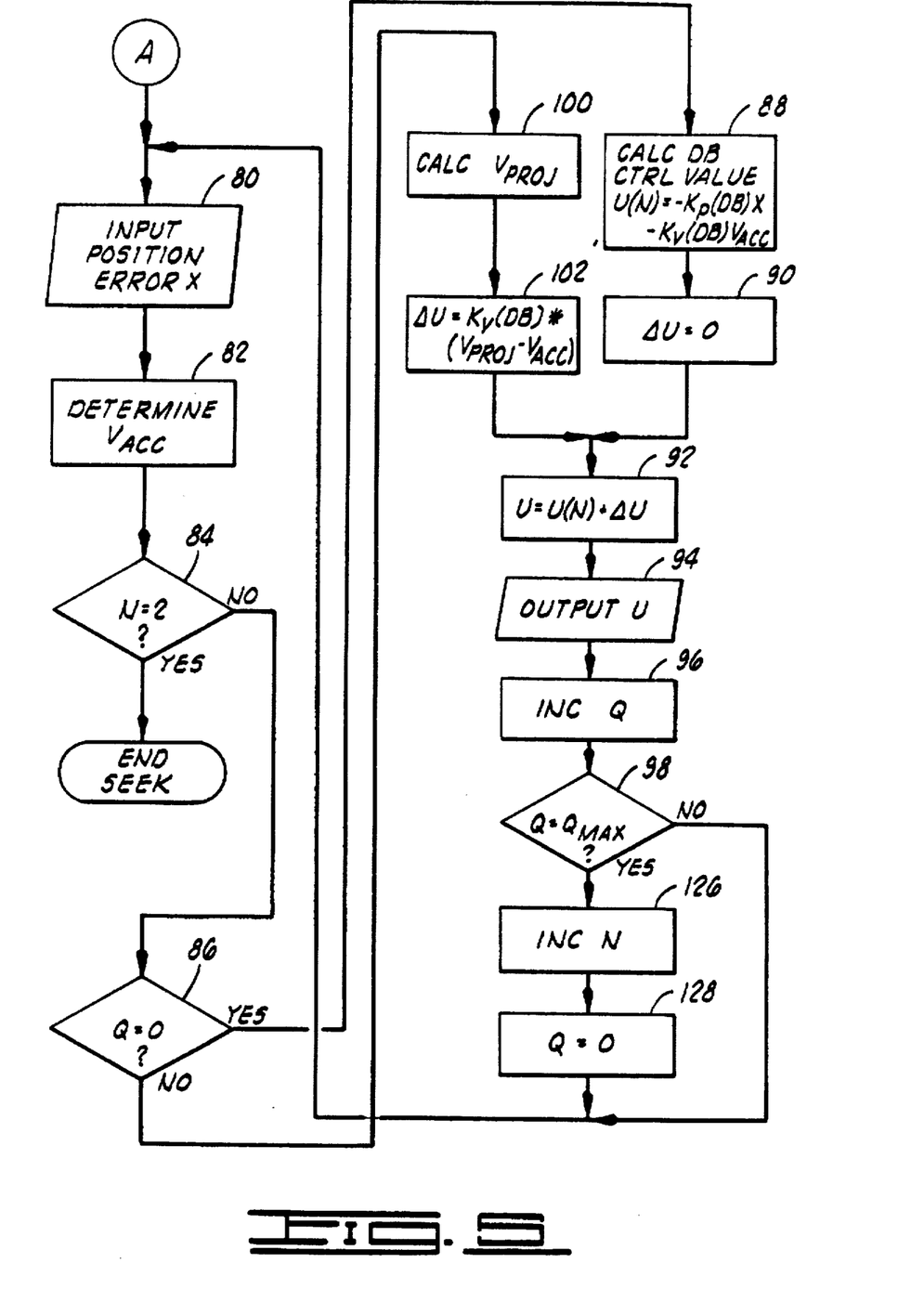
FIG. 5 is a flow chart illustrating the method for settling a transducer on a target track in accordance with the present invention.

Referring now to FIG. 5, shown therein is flow chart of the servo microprocessor 28 programming by means of which one embodiment of the settle method of the present invention is carried out. For purposes of example, the flow chart in FIG. 5 contemplates that the deadbeat settle strategy that has been utilized to determine the deadbeat constants employed in the present invention is a second order strategy so that the settle of the transducer 18 on a target track will be accomplished in two deadbeat intervals. Each of these deadbeat intervals is comprised of a plurality, Qmax, of time intervals in which the steps illustrated in FIG. 5 are carried out. These time intervals can each be defined to be a selected loop time entered into the servo microprocessor 28 or, in a disc drive having a servo system as described in the aforementioned U.S. Pat. No. 5,262,907, to be one interrupt of the servo microprocessor 28. In any event, the present invention contemplates that the transducer 18 will be brought substantially to rest at substantially the target track in a number of time intervals that is determined by the product of the number of time intervals in a deadbeat interval and the number of deadbeat intervals selected to determine the deadbeat constants that are utilized in carrying out the transducer settle method of present invention. As noted above, the number of deadbeat intervals is a function of the order of the system.

In initial steps of each time interval of each deadbeat interval by means of which the settle method of the present invention is implemented, parameters indicative of the present mechanical state are inputted from the servo logic IC 34 to provide a basis for determining the control signal to be outputted to the power amplifier 36 via the servo logic 34. Such parameters include a position error X, step 80, that provides a measure of the distance between the transducer 18 and the target track and other parameters that depend upon the features that have been incorporated in the disc drive in which the method of the present invention is practiced. In particular, if the disc drive includes a velocity transducer 56, the velocity of the transducer 18 will also be inputted. Similarly, the current through the coil 38 at the beginning of the time interval is inputted if the disc drive in which the invention is practiced has a capability for measuring the coil current and providing such current to the servo microprocessor 28.

These additional parameters can be used to determine an accepted velocity for the transducer 18 at the beginning of the time interval in a step that has been generally indicated at 82 in FIG. 5. Thus, if the disc drive includes a velocity transducer 56, the step 82 would be the input of the velocity measurement made by the velocity transducer 56. In such case, the accepted velocity would be the actual velocity of the transducer 18 as measured by the velocity transducer 56.

However, the accepted velocity need not be the actual velocity of the transducer 18 and the disc drive 10 need not include a velocity transducer 56 for the practice of the present invention. As will be clear to those of skill in the art, the actual final state of the transducer 18 need not be the ideal deadbeat settle final state in which the velocity of the transducer 18 and the position error for the transducer 18 are zero. Indeed, such conditions are not maintained during track following by the transducer 18 while files are written to or read from a data track. Thus, the method of the present invention does not have as its purpose the reduction of the final state of the transducer 18 to the deadbeat ideal; rather, the present invention achieves a practical final state for the transducer 18 in which the track following mode of operation of the disc drive servo system, carried out during reading and writing of files, will commence with the transducer 18 in substantially a state that might exist during track following. Computer simulations have shown that such a final state of the transducer 18 can be achieved by using approximate values of the actual velocity of the transducer 18 as the accepted velocity at the beginning of each time interval of each deadbeat interval.

In accordance with the above remarks, a second method of determining the accepted velocity of the transducer 18, useful when the parameters available to the servo microprocessor 28 include the current through the actuator coil 38, is to adjust the average velocity of the transducer 18 determined for the previous time interval for the acceleration of the transducer 18 during that time interval. Thus, if the locations of the transducer 18 at the beginning of a time interval Q is denoted X(Q) and the duration of each time interval of each deadbeat interval is denoted T, the accepted velocity can be determined in accordance with the expression $$V_{acc}(Q)=(1/T)[X(Q)-X(Q-1)]+(\tfrac{1}{2}) K_m I(Q) T \qquad (6)$$

where the first term is the average velocity at the temporal center of the previous time interval and the second term in the increase in velocity from the center of such previous time interval to the beginning of the present time interval using the expression for the acceleration of the transducer 18 in relation to the actuator coil current expressed above in equation (1).

In disc drives which have neither a velocity transducer 56 nor a means of providing the actuator coil current to the servo microprocessor 28, the accepted velocity can be determined from a series of successive locations of the transducer 18 in accordance with the relationship $$V_{acc}=(1/T) [(\tfrac{3}{8}) X(Q)-(\tfrac{7}{2}) X(Q-1)+X(Q-2)-(\tfrac{1}{8}) X(Q-3)] \qquad (7)$$

where the numerical coefficients of the successive positions of the transducer 18 have been selected to include the effects of both the acceleration of the transducer 18 and time derivative of the acceleration, the so-called "jerk", of the transducer 18 in the determination of the transducer 18 accepted velocity.

Once the accepted velocity of the transducer 18 has been determined at the beginning of the time interval, a check is made, decision block 84, to determine whether the settle has been completed. In the case in which the deadbeat constants used in the practice of the present invention are determined from a second order deadbeat strategy, two deadbeat periods would be used to settle the transducer 18 on the target track and a convenient criterion that the settle has been completed is that the deadbeat interval index N, initialized to zero at the start of the seek that terminates in the settle method of the present invention, has advanced to 2 as shown in FIG. 5. (As will be discussed below, the deadbeat interval index is incremented at the end of each deadbeat interval.) In circumstances in which the deadbeat constants used in the practice of the present invention are determined from a higher order deadbeat strategy, the order of such strategy would be used in decision block 84.

In the settle method of the present invention, a deadbeat value of the control signal outputted to the power amplifier 36 is determined in the first time interval of each deadbeat interval using the control equation for the ideal deadbeat settle strategy that served as the basis for determining the deadbeat constants utilized in carrying out the present inventive method. These values are then corrected in each time interval to determine control signals that are outputted to the power amplifier to achieve a settle of the transducer 18 that closely follows an ideal deadbeat settle to bring the transducer to a location substantially on the target track with a velocity of substantially zero.

To provide for the determination of the deadbeat value, the index Q identifying each-time interval of each deadbeat interval is checked, step 86, in each execution of the routine illustrated by the flow chart of FIG. 5 for which the deadbeat index is less than the order of the deadbeat strategy utilized to determine the deadbeat constants. If, as will be the case for the initial execution of the routine, the time interval index Q is zero, the deadbeat value to be utilized for the entire deadbeat interval is calculated, step 88. In the case in which the inventive method utilizes second order deadbeat constants, Kp(DB) and Kv(DB), as described above, the deadbeat control value is determined in accordance with the relation $$U(N) = -Kp(DB) \, X - Kv(DB) \, Vacc \qquad (8)$$

where Kp(DB) and Kv(DB) are the second order deadbeat constants determined as described above, X is the location of the transducer 18 at the beginning of the first time interval of the deadbeat interval and Vacc is the accepted value of the transducer velocity at the beginning of the first time interval of the deadbeat interval determined as described above.

In the embodiment of the inventive method illustrated by the flow chart of FIG. 5, the control signal correction is selected to be zero for the first time interval of each deadbeat interval, step 90, so that the control signal outputted to the power amplifier 36 in the first time interval of each deadbeat interval, determined by adding the interval correction to the deadbeat value, step 92, will be the deadbeat value of the control signal. Such signal is outputted to the power amplifier 36, step 94, and the time interval index Q is incremented, step 96, to permit appropriate corrections to be determined for succeeding time intervals of the deadbeat interval.

Following the increment of the time interval index, the value of the index is compared to the number Qmax of time intervals in each deadbeat interval, step 98, and, if the value of the index is less than Qmax, the servo microprocessor 28 returns to the start of the flow chart for the determination and output of the correction signal to the power amplifier 36 for the next time interval of the deadbeat interval. (In a disc drive having a servo system as described in the aforementioned U.S. Pat. No. 5,262,907, such return will be effected by terminating the present interrupt in which the above noted steps are carried out; in disc drives in which the steps are carried out during execution of the main program of the servo microprocessor 28, a wait step (not shown) can be included in the programming to establish a fixed duration for the time intervals of the deadbeat intervals.)

In each time interval of each deadbeat interval following the first such time interval, the time interval index Q will be a value other than zero. In such time intervals, the deadbeat value calculated in the first time interval is corrected to compensate for disturbances that would cause the transducer 18 to depart from a practicable settle if an ideal deadbeat strategy were used. To this end, in each succeeding time interval of each deadbeat interval, a projected velocity at the beginning of the time interval for ideal deadbeat settle is calculated, step 100, and used to determine the time interval correction which, in combination of totality of time interval corrections for the remaining time interval of all deadbeat intervals, will result in settle of the transducer 18 on the target track that closely approximates ideal deadbeat settle.

The projected velocity is determined on the basis of the characteristics of ideal deadbeat settle illustrated in FIGS. 2 and 3. More particularly, as shown in FIG. 2, ideal deadbeat settle contemplates a constant acceleration of the transducer 18 during each time interval of each deadbeat interval and such acceleration is determined by the deadbeat value of the control signal in accordance with equations (1) and (2) above. Thus, the projected velocity; that is, the velocity the transducer 18 would attain under ideal deadbeat settle at the beginning of the Qth time interval of the Nth deadbeat interval would be given by $$Vproj(Q) = Km \, Ki \, U(N) \, QT. \qquad (9)$$

The time interval correction term for the Qth time interval is then determined, step 102, in accordance with the relation $$U(Q) = Kv(DB) \, [Vproj(Q) - Vacc(Q)]. \qquad (10)$$

Thus, the correction is a term that compensates for differences between the velocity the transducer 18 would have for ideal deadbeat settle and the velocity the transducer is caused to have by the presence of disturbances. The time interval correction is then added to the deadbeat value of the correction signal calculated in the first time interval of each deadbeat interval, step 92, and outputted to the power amplifier 36, step 94, as described above.

The correction of the control signal outputted to the power amplifier 36 in each time interval and the effect of the corrections during the settle of the transducer 18 has been illustrated in FIGS. 2 and 3 for a representative case in which the actuator 40 is subjected to disturbances which will tend to cause the transducer 18 to overshoot the target track at the end of a seek; that is, to attain velocities that are higher than velocities that would be attained in ideal deadbeat settle. More particularly, FIG. 2 compares accepted velocities, indicated by circles 104, 106, 108, 110, 112, 114, 116, 118, 120 and 122 determined at the start of the time intervals of the deadbeat intervals to the ideal deadbeat velocity curve and FIG. 3 illustrates the corresponding interval corrections that would be added to the deadbeat control value in each of the time intervals. Thus, for example, for the accepted velocity indicated by the circle 108 determined at the start of the Q=3 time interval of the N=1 deadbeat interval, the time interval correction determined in accordance with equation (10) above would be a negative value indicated at 124 in FIG. 3 that would give rise to a larger braking force on the actuator 40 than would be exerted for an ideal deadbeat strategy to compensate for tendency of the disturbance to cause the transducer 18 to overshoot the target. As indicated in FIG. 2, the totality of the time interval corrections results in a trajectory that terminates in a velocity of the transducer 18 at the end of the settle that is substantially zero and a location, compared to the final location of zero for ideal deadbeat settle, that differs from the location of zero for ideal deadbeat settle only by the difference of the areas under the deadbeat velocity curve and the trajectory of the transducer 18 indicated by the accepted velocity points. Thus, at the end of the final time interval of the final deadbeat interval, the transducer 18 will be located substantially on the target track with a velocity of substantially zero.

Returning to FIG. 5, each time the time interval index Q reaches the maximum value Qmax, the deadbeat interval index N is incremented, step 126, and the time interval index Q is reset to zero, step 128, so that the settle of the transducer 18 will be effected in N deadbeat intervals and will then terminate at the decision block 84. Following the termination of the settle, the servo microprocessor 28 exits to a conventional track following mode of operation.

Figure 6:
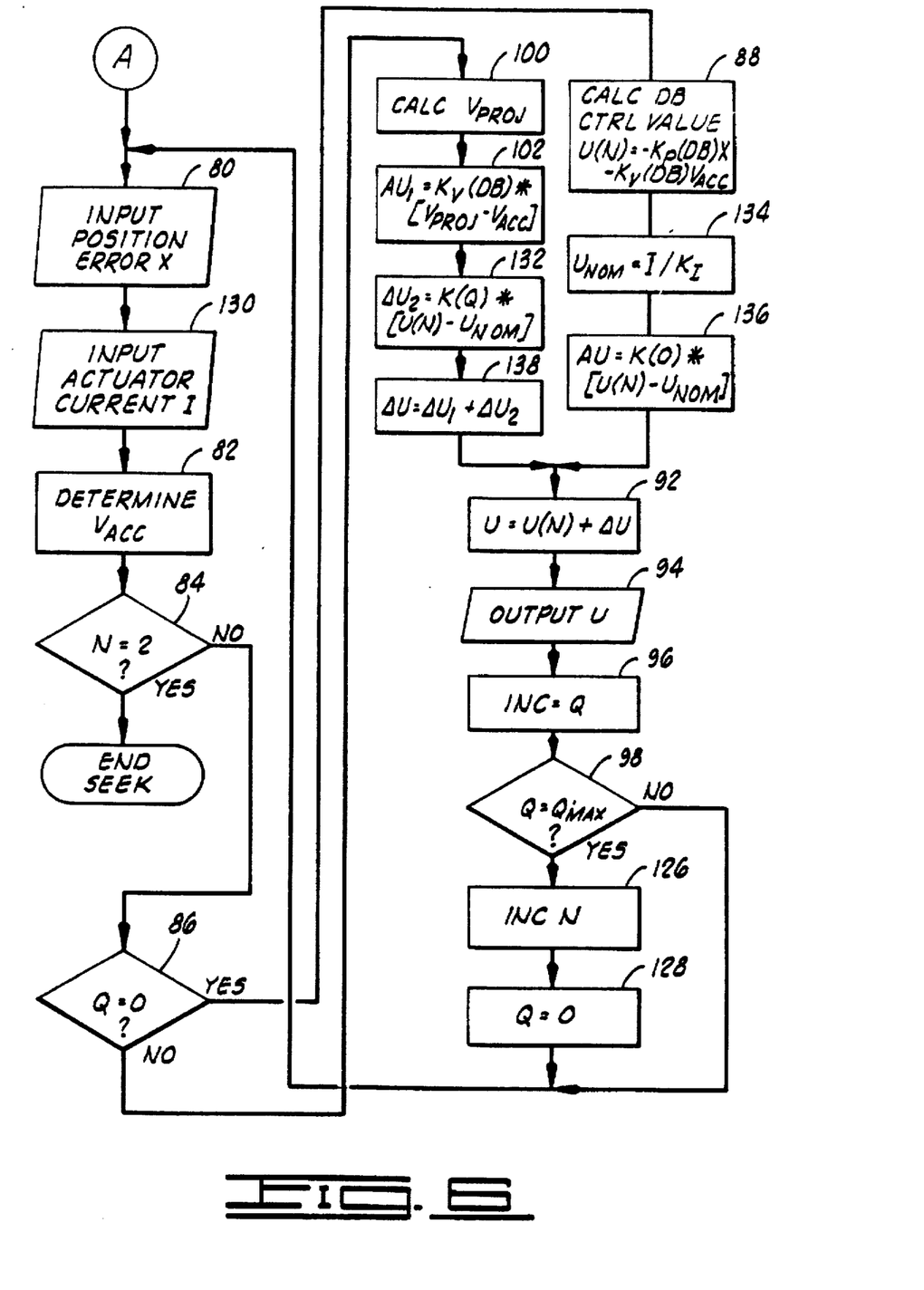
FIG. 6 is a flow chart illustrating a modification of the method for settling a transducer on a target track in accordance with the present invention.

FIG. 6 illustrates a modification of the invention which is useful in disc drives in which the time constant for the power amplifier is large in comparison with the duration of the time intervals of the deadbeat intervals. In such case, the actuator coil current can differ significantly from the value determined by equation (2) for several time intervals at the beginning of each deadbeat interval to result in a final state that differs appreciably for the ideal deadbeat final state. FIG. 6 illustrates the manner in which the effect of a large power amplifier time constant can be compensated.

Most of the steps of the embodiment of the invention illustrated in FIG. 6 are the same as the steps of the embodiment illustrated in FIG. 5 so that only the differences need be noted for purposes of the present disclosure. Accordingly, steps that are identical to steps carried out in the embodiment illustrated in FIG. 5 have been given the same numerical designations used in FIG. 5 and will not be further discussed.

In the embodiment illustrated in FIG. 6, it is contemplated that the disc drive will include a capability for providing the actuator coil current to the servo microprocessor 28 and such current is inputted, step 130, following input of the transducer position error at step 80. The actuator coil current then provides a basis for determining a second time interval correction that is added to the time interval corrections shown in FIG. 5, such time interval corrections for time intervals other than the first time interval of each deadbeat interval constituting a first time interval correction determined as described above for FIG. 5. Thus, the embodiment shown in FIG. 6 contemplates the determination of a first time interval correction $\Delta U1$ in the step 102 and a second time interval correction in a succeeding step 132 in time intervals other than the first time interval of each deadbeat interval. Similarly, since a long time constant for the power amplifier will have the greatest effect on transducer settle in the first time interval of each deadbeat interval, a correction is determined for each of the first time intervals of the deadbeat intervals as well. It will be useful to initially consider the correction made in the first time interval of each deadbeat interval.

As will be appreciated by those of skill in the art, the effect of a long time constant for the power amplifier 36 will be to delay changes in the current that is passed through the actuator coil 38 when a change in the control signal outputted by the servo microprocessor 28 occurs. While such a delay will have a negligible effect on the settle of the transducer 18 for small changes in the control signal from one time interval of a deadbeat interval to another time interval of the same deadbeat interval, the relatively large change in the control signal that can be expected at the beginning of each deadbeat interval will not be reflected in the acceleration of the transducer 18 for a time that depends on the amplifier time constant. More particularly, a change in the current arising from a step change in the control signal will generally be an exponential function of time.

To correct for this exponential change, it is recognized that the value of the current inputted to the servo microprocessor at the beginning of the first time interval of each deadbeat interval will be the value of the current that was determined by the control signal for the last time interval of the previous deadbeat interval or the last time interval during velocity control of the transducer 18. Such current will correspond to a nominal control signal value via the relationship expressed in equation (2). Such nominal value is calculated in the first time interval of each deadbeat interval, step 134, and utilized in the determination of a time interval correction in all time intervals of the deadbeat interval. More particularly, the nominal value of the control signal is subtracted from the deadbeat value of the control signal determined in the first interval of each deadbeat interval to obtain a change in control signal that corresponds to the difference between ideal deadbeat currents for two successive deadbeat intervals or between the last velocity control current and the ideal deadbeat current for the first deadbeat interval. Accordingly, the compensation can be effected by multiplying the difference between the deadbeat value for the correction signal and the nominal control signal value by a discrete time interval dependent function that corresponds to exponential decay of the actuator coil current from one value to another; that is, a discrete representation of the function $$K(t)=K(0)\exp(-t/Tc), \quad (11)$$

where Tc is the power amplifier time constant, and selecting K(0) to be a weighting value that will cause the area under the curve expressed by equation (11) from t=0 to t=T, the duration of a time interval of a deadbeat interval, to be K(0) T. Thus, in the first time interval of each deadbeat interval, a time interval correction $$\Delta U=K(0) [U(N)-Unom] \quad (12)$$

is generated, step 136, and added to the deadbeat value of the control signal at step 92 for output to the power amplifier 36 during the first time interval of the deadbeat interval.

In succeeding time intervals of each deadbeat interval, the form of equation (11) is utilized to determine the second time interval correction that has been referred to above. Specifically, since the time intervals of the deadbeat intervals are of the same duration T, the second time interval corrections calculated at step 132 can be found by evaluating the exponential function of equation (11) at successive multiples of the time interval T. Thus, the second time interval corrections for time intervals of the deadbeat intervals are generally given by $$\Delta U_2=K(Q) [U(N)-Unom], \quad (13)$$

where $$K(Q)=K(0) \exp(-Q T/Tc). \quad (14)$$

These time interval corrections are added, step 138, to the first time interval corrections calculated at step 102 to obtain time interval corrections which, in combination with each other and with the deadbeat values of the control signal, will cause the transducer 18 to settle to the target track in a manner that closely approximates ideal deadbeat settle.

It will be clear that the present invention is well adapted to carry out the objects and attain the ends and advantages mentioned as well as those inherent therein. While embodiments have been described for purposes of this disclosure, numerous changes may be made which will readily suggest themselves to those skilled in the art and which are encompassed in the spirit of the invention disclosed and as defined in the appended claims.

What is claimed is:

1. In a disc drive of the type having a rotatable disc and a controllably positionable actuator adjacent the disc, the disc including a surface upon which a plurality Of tracks are defined, the actuator having a transducer for reading data from and writing data to the tracks, the disc drive further having a power amplifier for driving the actuator to accelerate the transducer radially across the disc surface in response to a control signal and a servo system, including a servo microprocessor, for generating the control signal in relation to measured parameters indicative of at least the location of the transducer with respect to a target track, a method for settling the transducer onto the target track during which the transducer is controllably decelerated from a non-zero initial velocity at a selected distance from the target track to a substantially zero terminal velocity over the target track, the method comprising the steps of:

inputting said parameters to the servo microprocessor in each of a plurality of time intervals, wherein said time intervals are grouped into a plurality of deadbeat intervals;

determining a deadbeat value of said control signal from said parameters in the first time interval of each deadbeat interval;

determining an interval correction to said deadbeat value for each time interval of each deadbeat interval;

generating the control signal in relation to the sum of the deadbeat value and the interval correction; and     outputting the control signal from the servo microprocessor to the power amplifier.

2. A method for settling a transducer on a target track on the surface of a rotating disc of a hard disc drive of the type having an actuator whereon the transducer is mounted, a power amplifier for driving the actuator to accelerate the transducer radially across the disc surface in response to a control signal and a servo system, including a servo microprocessor, for generating the control signal in relation to measured parameters indicative of at least the location of the transducer with respect to the target track, comprising the steps of:

inputting said parameters to the servo microprocessor in each of a plurality of time intervals, wherein said time intervals are grouped into a plurality of deadbeat intervals;

determining a deadbeat value of said control signal from said parameters in the first time interval of each deadbeat interval;

determining an interval correction to said deadbeat value for each time interval of each deadbeat interval, comprising the steps of:

selecting a time interval correction of zero for the first time interval of each deadbeat interval; and         for each remaining time interval of the deadbeat interval, the steps of:

determining an accepted value of the transducer velocity at the beginning of the time interval from said parameters;

determining a projected value of the transducer velocity at the beginning of the time interval from the deadbeat value of the control signal; and             determining the time interval correction in proportion to the difference between the projected value of the transducer velocity and the accepted value of the transducer velocity;

generating the control signal in relation to the sum of the deadbeat value and the interval correction; and     outputting the control signal from the servo microprocessor to the power amplifier.

3. A method for settling a transducer on a target track on the surface of a rotating disc of a hard disc drive of the type having an actuator whereon the transducer is mounted, a power amplifier for driving the actuator to accelerate the transducer radially across the disc surface in response to a control signal and a servo system, including a servo microprocessor, for generating the control signal in relation to measured parameters indicative of at least the location of the transducer with respect to the target track and the output of the power amplifier, comprising the steps of:

inputting said parameters to the servo microprocessor in each of a plurality of time intervals, wherein said time intervals are grouped into a plurality of deadbeat intervals;

determining a deadbeat value of said control signal from said parameters in the first time interval of each deadbeat interval;

determining an interval correction to said deadbeat value for each time interval of each deadbeat interval, comprising the steps of:

in the first time interval of each deadbeat interval the steps of:

determining a nominal control signal value corresponding to the power amplifier output inputted to the microprocessor in said first time interval of the deadbeat interval; and             determining the interval correction in relation to the difference between said deadbeat value of the control signal and said nominal control signal value; and         in each remaining time interval of the deadbeat interval, the steps of:

determining an accepted value of the transducer velocity at the beginning of the time interval from said parameters;

determining a projected value of the transducer velocity at the beginning of the time interval from the deadbeat value of the control signal;

determining a first time interval correction in proportion to the difference between the projected value of the transducer velocity and the accepted value of the transducer velocity;

determining a second time interval correction in relation to the difference between said deadbeat value of the control signal and said nominal control signal value; and             adding the first and second time interval corrections to obtain the interval correction for the time interval;

generating the control signal in relation to the sum of the deadbeat value and the interval correction; and     outputting the control signal from the servo microprocessor to the power amplifier.

* * * * *

UNITED STATES PATENT AND TRADEMARK OFFICE
CERTIFICATE OF CORRECTION

PATENT NO. : 5,691,617
DATED : November 25, 1997
INVENTOR(S) : Funches

It is certified that error appears in the above-identified patent and that said Letters Patent is hereby corrected as shown below:

Column 1, line 62, delete "trick" and insert --track--.

Column 7, line 22, delete "and Kp(DB)" and insert --and Kv(DB)--.

Column 15, line 1, delete "Of" and insert --of--.

Signed and Sealed this

Fifteenth Day of December, 1998

Attest:

BRUCE LEHMAN

Attesting Officer

Commissioner of Patents and Trademarks